United States Patent [19]

Wernicke et al.

[11] Patent Number: 4,632,763

[45] Date of Patent: Dec. 30, 1986

[54] PROCESS FOR TREATING PHOTOGRAPHIC WASHING WATERS

[75] Inventors: Ubbo Wernicke, Cologne; Heinz Meckl, Bergisch Gladbach, both of Fed. Rep. of Germany

[73] Assignee: Agfa Gevaert Aktiengesellschaft, Leverkusen, Fed. Rep. of Germany

[21] Appl. No.: 744,993

[22] Filed: Jun. 17, 1985

[30] Foreign Application Priority Data

Jun. 29, 1984 [DE] Fed. Rep. of Germany ....... 3424064

[51] Int. Cl.[4] ................................................ C02F 1/42

[52] U.S. Cl. .................................... 210/670; 210/684; 210/904

[58] Field of Search ............... 210/670, 684, 904, 672; 423/367

[56] References Cited

U.S. PATENT DOCUMENTS

| | | | |
|---|---|---|---|
| 3,788,983 | 1/1974 | Fries | 210/684 |
| 3,869,383 | 3/1975 | Shimamura et al. | 423/367 |
| 3,931,004 | 1/1976 | Shimamura et al. | 423/367 |
| 3,984,314 | 10/1976 | Fries | 210/684 |
| 4,043,907 | 8/1977 | Shimamura et al. | 423/367 |
| 4,115,260 | 9/1978 | Avery | 210/684 |
| 4,267,159 | 5/1981 | Crits | 210/684 |

*Primary Examiner*—Ivars Cintins

*Attorney, Agent, or Firm*—Connolly and Hutz

[57] ABSTRACT

Hexacyanoferrate ions are removed from washing waters using a weakly basic anion exchanger of the acrylic type containing tertiary amino groups. The anion exchanger is treated with an alkali metal hydroxide and an alkali metal dihydrogen phosphate solution.

4 Claims, No Drawings

PROCESS FOR TREATING PHOTOGRAPHIC WASHING WATERS

This invention relates to a process for treating washing waters which contain hexacyanoferrate ions.

The treatment of photographic washing waters containing ferricyanide and ferrocyanide ions with known types of weakly basic anion exchange resins is disclosed in DE-OS 2 256 601, 2 320 174 and U.S. Pat. Nos. 3,869,383, 4,043,907 and 3,931,004. The treatment of the washing waters with the anion exchange resin takes place in the presence of borate ions or of ammonium and thiosulphate ions. The ferricyanide and ferrocyanide ions in the washing water are taken up by the anion exchange resins and are washed out of them again using aqueous alkali metal hydroxide solution. The eluate obtained can be used as a photographic bleaching bath after dilution with water and addition of the necessary chemicals.

The known processes have the problem that the photographic waste solutions may contain cyano compounds of considerable toxicity. Only a portion of the eluates which contain the cyano compounds and are used as bleaching baths can be recycled into the photographic processing operation. The resulting quantity of eluate diluted with water far exceeds the quantity of bleaching bath which is to be replaced in the course of processing. Most of the solutions which are obtained by the known processes and contain cyano compounds therefore have to be disposed of.

An object of the invention is to develop a process for the removal of hexacyanoferrates contained in washing waters after colour photographic bleaching baths, optionally under recycling them into the bleaching bath used in processing. The increase in volume and the quantity of hexacyanoferrate-containing solution to be disposed of should be kept as small as possible.

The solution to the problem according to the invention is based on a process for treating washing waters, which contain hexacyanoferrate ions and are e.g. produced after the bleaching process in colour photographic processing, with weakly basic anion exchange resins, in which the hexacyanoferrate ions are absorded onto the resin, are eluted with an aqueous alcaline solution, preferably a metal hydroxide solution or ammonium hydroxide solution and may be recycled into the photographic processing operation.

The process according to the invention is characterised in that a weakly basic anion exchange resin of the acrylic type with tertiary amino groups as binding groups, charged with hexacyanoferrate ions, is treated in succession with a dilute aqueous alcaline, preferably alkali metal or ammonium hydroxide solution and with an aqueous solution of a dihydrogen phosphate preferably an alkali metal or ammonium dihydrogen phosphate. The two solutions may then be combined with the overflow produced during the bleaching bath regeneration process. An oxidizing agent for the hexacyanoferrate-II-ions contained therein and the renewing chemicals required for regenerating the bleaching bath may be added to the combined solutions, and the solution thus obtained may be used as replenisher for the bleaching bath.

Preferred weakly basic anion exchange resins comprise as matrix a copolymer of divinylbenzene and acrylic acid, wherein the acidic groups have been reacted with an alkylenediamine under formation of an amide. The N-atom of the alkylenediamine which has not been used for the amide formation is substituted, preferably with two methyl groups, under formation of a tertiary amino group.

Reliable operation of the anion exchanger is ensured in each case if the unused exchange resin is conditioned before the first charging operation by protonation with an acid. In the further process, the treatment with alkali metal hydrogen phosphate ensures adequate protonation.

The term "replenisher" describes a solution which is added to the bath as a function of the quantity of material running through a photographic bath. It makes up for the substances consumed during the respective stage of processing.

The term "regenerator" refers to compounds which are added to the tank overflow so as to form a replenisher which is ready for use and re-enters the process.

The process according to the invention is designed to produced a minimal volume of eluate during regeneration of the anion exchanger so that a minimal excess volume of waste leaves the system. Moreover, the eluate should only contain substances required for making up the bleach bath overflow to form the replenisher or, at least, which are not harmful substances. Obviously, a certain increase in volume cannot be completely avoided because a photographic material with swollen layers enters the bleaching bath and thus leaves the bath again. Therefore, the eluate from the subsequent washing water treatment basically represents an excess volume if it is used for regenerating the overflow. An excess of replenisher which is ready for use remains. However, this excess is very small and does not generally exceed 10%.

It is obviously also possible to take away the expected excess volume from the overflow before addition of the eluate.

With weakly basic anion exchange resin of the acrylic type containing tertiary amino groups as binding groups, a hexacyanoferrate take-up of from 70 to 100 g per liter of resin is achieved and a yield of from 95 to 100% of the bound hexacyanoferrates is achieved during during regeneration.

The take-up of hexacyanoferrate is dependent on the conditioning of the exchange resin with acidic compounds, the tertiary amino groups being protonated to ammonium groups. Protonation is achieved in the process according to the invention by using an alkali metal dihydrogen phosphate. The use of this type of compound has the surprising advantage that the alkali metal dihydrogen phosphate is required for regenerating the tank overflow and, at the same time, is capable of completely protonating the exchange resin in spite of the relatively high pH of its solution of 4.8. Protonation treatments of this type are otherwise carried out using strong mineral acids.

Alkali metal hydroxides such as sodium hydroxide or potassium hydroxide are best suited as regenerating agents for removing the hexacyanoferrates from the anion exchange resin.

Alkali metal hydroxides are harmless compounds for the re-use according to the invention of the eluate produced during regeneration. They are neutralized by the dihydrogen phosphate entering the hexacyanoferrate solution in the course of the present process, forming neutral phosphates. Compounds which can subsequently be used for producing the replenisher from the eluate are thus formed.

Protonation with the aqueous solution of the alkali metal dihydrogen phosphate directly follows the regeneration of the exchange resin with an aqueous alkali metal hydroxide solution, i.e. without interim washing. An unnecessary increase in volume is avoided by this procedure.

The alkali metal hydroxides for regenerating the exchange resins can be used as from 0.1 to 45% by weight aqueous solutions. 3 to 10% by weight solutions of sodium or potassium hydroxide are preferred. The alkali metal dihydrogen phosphates are used as from 0.1 to 1.67 molar and preferably as from 0.5 to 1 molar aqueous solution. From 1 to 5 liters of each of the two solutions are required per liter of exchange resin. Excellent results are, achieved, for example, with 2.5 liters of 8% by weight sodium hydroxide solution and 2.5 liters of 1 molar potassium dihydrogen phosphate solution. 5 liters of eluate are then obtained per liter of exchange resin charged, for example, with 85 g of $K_3Fe(CN)_6$.

Potassium peroxodisulphate, for example, is suitable as oxidizing agent for converting the hexacyanoferrate-II-ions into hexacyanoferrate-III-ions. The cyanoferrates are used as hexacyanoferrate (III) in the bleaching bath.

The process according to the invention opens up a method for processing photographic material more economically and also affords excellent advantages with respect to a reduction in the chemical loading of photographic waste water. Photographic processing baths must be replenished for achieving constant processing conditions. This means that a specific quantity of replenisher is added to the individual processing baths, depending on the quantity of processed photographic material, to maintain the chemical activity of the baths. The addition of the replenisher causes a corresponding volume of consumed working solution simultaneously to leave the container via the overflow and enter the waste water. In addition, the chemicals are carried over from the baths into the washing treatment by the actual photographic material since superficially adhering chemicals can only be squeezed off inadequately and the chemicals absorbed in the emulsion layers cannot be removed mechanically. Of photographic chemicals, hexacyanoferrates require particular attention with respect to the purification of waste water owing to their high toxicity. The discovery of the present process has enabled the waste waters to be kept free from these pollutants, on the one hand, and has enabled the cyanoferrates to be reused to the processing operation in a surprisingly advantageous manner on the other hand.

The invention is described in more detail with reference to the following Examples.

EXAMPLE 1

A conventional commercial colour photographic paper is processed in a process employing a hexacyanoferrate bleaching bath.

Processing at 33°, wash 30°
3.5 min developer
1 min stop bath
1 min first wash
2 min bleaching bath
2 min second wash in two divided tanks in a counter-current mode
1 min fixing bath
3 min third wash.

The developer, stop bath and fixing bath are mixed according to generally known formulations. Effective squeezers are used at the end of the first wash, the bleaching bath and the second wash.

| | Bleaching bath, 1 liter of Tank filling | replenisher |
|---|---|---|
| sodium hexametaphosphate | 3.5 g | 5 g |
| potassium hexacyanoferrate (III) | 8.2 g | 10 g |
| potassium bromide | 8 g | 12 g |
| disodium hydrogen phosphate | 5.25 g | 7 g |
| potassium dihydrogen phosphate | 14.25 g | 19 g |
| pH | 6 | 6 |
| replenishment rate | — | 325 ml/m$^2$ |

The water for the wash following the bleaching bath is continuously circulated via an ion exchange column, during which process the hexacyanoferrates (II) and (III) are removed from it. The washing water initially runs out of the first tank immediately following the bleaching bath and, after the specified treatment, is supplied to the second tank following the bleaching bath.

The exchange column is filled with 10 l of a weakly basic acrylic-based anion exchanger with tertiary amino groups as binding groups and is treated with 20 l of 5% sulphuric acid. After the treatment of the fresh exchanger which is rinsed with a further 10 l of water, the throughput of washing water begins. The throughput of washing water amounts to 3 liters per m$^2$ of processed paper.

After throughput of 5 m$^3$ of washing water, the column contains 850 g of hexacyanoferrate (II) and (III), expressed as potassium hexacyanoferrate (III). After throughput of this quantity, the water is released from the column. 25 l of 8% sodium hydroxide solution are then passed through the column at a rate of 2.5 l per liter of resin per hour, and the solution is released and is stored. 25 l of potassium dihydrogen phosphate solution (140 g/l) are then charged through the exchange column under the same conditions. The solutions of sodium hydroxide solution and potassium dihydrogen phosphate are combined. They amount to 50 l together and contain 850 g of hexacyanoferrates, expressed as potassium hexacyanoferrate (III). This quantity of potassium hexacyanoferrate is carried over by 1500 m$^2$ of the photographic paper from the bleaching bath into the wash. The same quantity of paper produces a tank overflow of 488 l. This is combined with the eluate of 50 l and a total volume of 538 l is obtained. After treatment with potassium dihydrogen phosphate, the throughput of the hexacyanoferrate-containing washing water can be started again without rinsing the column with water.

In order to oxidise the divalent compound which is present in addition to the hexacyanoferrate (III), 484 g of potassium peroxodisulphate are added to this total volume. After a reaction time of one hour, the chemicals specified in the following table are added and a replenisher which is ready for use is obtained.

TABLE

| | Contained in 538 l (Eluate + Tankoverflow) | Set quantities for 538 l of replenisher | Quantity of rejuvenating chemicals for 538 l |
|---|---|---|---|
| Sodium hexametaphosphate | 1830 g | 2700 g | 870 g |
| Potassium | 4880 g | 5380 g | 500 g |

TABLE-continued

| | Contained in 538 l (Eluate + Tankoverflow) | Set quantities for 538 l of replenisher | Quantity of rejuvenating chemicals for 538 l |
|---|---|---|---|
| hexacyano-ferrate (III) | | | |
| Potassium bromide | 3900 g | 6460 g | 2560 g |
| Potassium dihydrogen-phosphate | 13000 g | 14000 g | 1000 g |

The pH should be adjusted to 6.0 using hydrogen phosphate or dihydrogen phosphate.

The small excess in volume is basically obtained by re-using the eluate. Only about 10% more replenisher than required is produced in the Example. Thus, 538 l of replenisher are produced when processing 1500 $m^2$ whereas only 538–50=488 l are required. The quantity of replenisher to be disposed of thus remains minimal.

EXAMPLE 2

Comparison of weakly basic anion exchangers of the styrene and acrylic type.

The exchange resins were conditioned before use with 5% sulphuric acid (2 l of acid per 1 or resin) and washed with water.

Take-up of hexacyanoferrate from bleaching bath washing water:

-continued

| | Styrene type | Acrylic type |
|---|---|---|
| Hexacyanoferrate take-up from washing water with 1 g/l | 36 g/l of resin | 88 g/l of resin |
| Hexacyanoferrate release during treatment with 8% sodium hydroxide solution | 2 g/l of resin | 85 g/l of resin |

The test results produced in the Table illustrate the superior effect of a weakly basic anion exchange resin of the acrylic type with tertiary amino groups as binding groups relative to a weakly basic anion exchange resin of the styrene type containing the same binding groups.

We claim:

1. A process for treating photographic washing waters containing hexacyanoferrate ions with a weakly basic anion exchange resin of the acrylic type with tertiary amino groups as binding groups in the protonated form wherein the photographic washing waters are contacted with said resin, thereby adsorbing the hexacyanoferrate ions onto the resin, then contacting the resin with a dilute aqueous alkaline solution for removing the hexacyanoferrate ions and then protonating the resin with an aqueous solution of a dihydrogen phosphate.

2. A process according to claim 1, characterised in that the aqueous solution of dihydrogen phosphate comprises a 0.5 to 1 molar aqueous solution of alkali metal dihydrogen phosphate and the dilute aqueous alkaline solution comprises a 3 to 8% by weight aqueous alkali metal hydroxide solution.

3. A process according to claim 1, characterised in that from 1 to 5 liters of each of the aqueous solutions are used per liter of anion exchange resin.

4. A process according to claim 1, characterised in that 2.5 liters of an 8% by weight aqueous sodium hydroxide solution and 2.5 liters of a 1 molar aqueous solution of potassium dihydrogen phosphate are used per liter of anion exchange resin.

* * * * *